(12) United States Patent
Akaba

(10) Patent No.: US 7,100,671 B2
(45) Date of Patent: Sep. 5, 2006

(54) METHOD OF MANUFACTURING CYLINDER HEAD

(75) Inventor: Konomi Akaba, Tochigi-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/967,351

(22) Filed: Oct. 19, 2004

(65) Prior Publication Data
US 2005/0082028 A1 Apr. 21, 2005

(30) Foreign Application Priority Data
Oct. 20, 2003 (JP) ............................. 2003-359929

(51) Int. Cl.
*B22D 19/00* (2006.01)
(52) U.S. Cl. ............................. 164/98; 164/10; 164/30; 164/100
(58) Field of Classification Search ................. 164/98, 164/10, 30, 100, 365, 366
See application file for complete search history.

(56) References Cited

U.S. PATENT DOCUMENTS 2,756,475 A * 7/1956 Hanink et al. ................ 164/30
3,722,577 A * 3/1973 Webb ........................ 164/366
4,195,683 A * 4/1980 Blazek ........................ 164/10

FOREIGN PATENT DOCUMENTS

| JP | 362050064 | * 3/1987 | .................. 164/47 |
|---|---|---|---|
| JP | 2001-193469 A | 7/2001 | |
| JP | 2002-501829 A | 1/2002 | |

\* cited by examiner

*Primary Examiner*—Kevin Kerns
*Assistant Examiner*—I. H. Lin
(74) *Attorney, Agent, or Firm*—Foley & Lardner LLP

(57) ABSTRACT

In a method of manufacturing a cylinder head having a partition plate for an intake port, there is prepared a partition plate having an intake-side distal end and a cylinder-side distal end. The partition plate is located in a core to form the intake port and molten metal is supplied to a periphery of the partition plate. After solidifying the molten metal, the core is removed. At least the intake-side distal end of the partition plate is located in an expansion-permit space that permits thermal expansion of the partition plate caused by heat of molten metal.

14 Claims, 7 Drawing Sheets

METHOD OF MANUFACTURING CYLINDER HEAD

BACKGROUND OF THE INVENTION

The present invention relates to a method of manufacturing a cylinder head and, more particularly, to a method of manufacturing a cylinder head with an intake port in which a partition plate is disposed.

In recent years, a cylinder of an internal combustion engine includes a cylinder head is formed with an intake port in which a partition plate, called as a tumble plate, is incorporated.

Japanese Patent Application Laid-Open Publication No. 2001-193469 (see paragraphs 0011, 0020 and 0022 and FIGS. 1, 3 and 4) and Japanese Patent Application National Publication of Translated Version No. 2002-501829 (see paragraph 0022 and FIG. 3) disclose structures wherein an airflow control valve disposed in an intake-side distal end of an intake port is controlled while permitting a partition plate to deflect intake air, introduced from the intake port to a cylinder bore, for intensifying tumble flow occurring inside the cylinder bore to achieve improvement over fuel consumption.

Incidentally, in the following description, for the partition plate, a side across which intake air, such as air and fuel gas, is passed is referred to as an "intake-side" and the opposite side, i.e., a cylinder bore side is referred to as a "cylinder-side".

SUMMARY OF THE INVENTION

However, upon studies conducted by the present inventor, examples of the partition plates include those which are integrally formed as partition walls that partition the intake ports, those which are formed in corrugated configurations to take countermeasures for the occurrence of deformation caused by thermal expansion during cast-in molding and those which have bosses or projections to allow the partition plates to reliably remain under a fixed condition during cast-in molding.

In any case, the partition plates must be formed in a thinned wall structure not to increase resistance in flow of intake air passing across the intake ports of the cylinder heads and consideration should be taken into account for thermal affect resulting from molten metal.

Especially, when cast molding the cylinder head, probabilities occur in which the partition plate is set in an intake-port forming sand core to perform cast-in formation. During such cast-in formation, a big difference occurs in coefficient of thermal expansion between the partition plate and the core that holds this partition plate, and it is conceived that the partition plate thermally expands due to heat of molten metal to adversely affect the core with a resultant formation of burrs in the cylinder head.

For this reason, it is conceived that not only a need arise for performing troublesome subsequent processing work but also a probability occurs with deterioration in cast quality, and consideration should be adequately taken for thermal affect on the partition plate.

However, it is hard for the partition wall, which partitions the intake port, to be formed in the thinned wall structure by cast molding, and probabilities occur with an increase in resistance in flow of intake air. Particularly, with the partition plate formed in the corrugated configuration, even though the partition plate is able to absorb the thermal expansion in a radial direction of the intake port, the thermal expansion in an axial direction of the intake port cannot be absorbed. Even with a circumferential periphery of the partition plate partly protruded to allow this projection to be cast in for reliably fixing the partition plate, such an attempt cannot be effective countermeasure against the thermal expansion of the partition plate occurring in the axial direction of the intake port.

The present invention has been completed upon such studies conducted by the present inventor and has an object to provide a method of manufacturing a cylinder head wherein even when a partition plate with a thinned wall is preliminarily set in a casting mold to allow the partition plate to be cast in with molten metal for cast molding, thermal affects resulting from molten metal can be minimized as less as possible for thereby performing smooth cast molding.

To achieve the above object, one aspect of the present invention provides a method of manufacturing a cylinder head having a partition plate for an intake port, which comprises: preparing a partition plate having an intake-side distal end and a cylinder-side distal end; locating the partition plate in a core to form an intake port such that at least the intake-side distal end of the partition plate is located in an expansion-permit space that permits thermal expansion of the partition plate caused by heat of molten metal; supplying molten metal to a periphery of the partition plate; solidifying the molten metal; and removing the core.

Other and further features, advantages, and benefits of the present invention will become more apparent from the following description taken in conjunction with the following drawings.

DETAILED DESCRIPTION OF THE PREFERRED EMBODIMENTS

Figure 1:
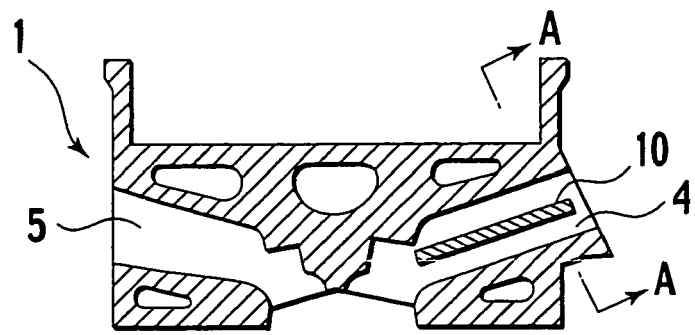
FIG. 1 is a schematic cross sectional view illustrating an engine cylinder head of a first embodiment according to the present invention.

Hereinafter, cylinder heads of various embodiments according to the present invention are described in detail with suitable reference to the accompanying drawings. Incidentally, throughout the various embodiments, the same component parts bear like reference numerals to suitably simplify or omit description.

First Embodiment

A first embodiment according to the present invention is described below.

First, a cylinder head 1 with a partition plate 10 for an intake port 4 is described.

Figure 2:
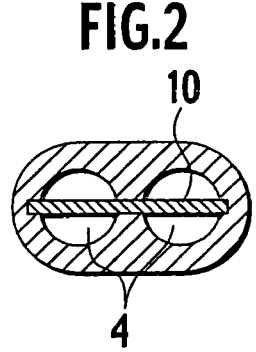
FIG. 2 is a cross sectional view, taken on an orthogonal plane, of an intake port of the presently filed embodiment and corresponds to a cross section taken on line A—A of FIG. 1.
Figure 3:
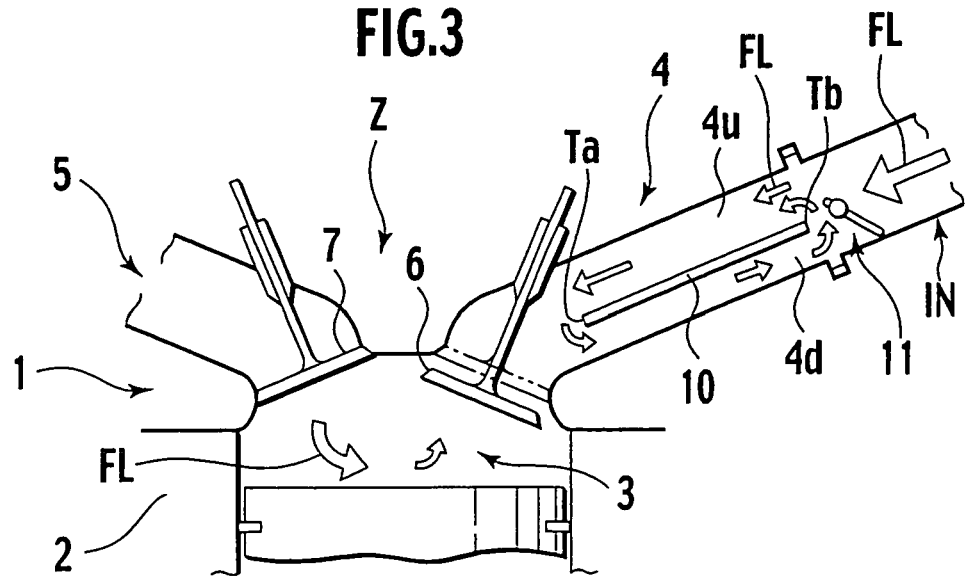
FIG. 3 is a schematic view illustrating an airflow current condition in the cylinder head of the presently filed embodiment to show the structure, shown in FIG. 1, more in detail.

FIG. 1 is a schematic cross sectional view illustrating a cylinder head 1, of an engine, of the presently filed embodiment; FIG. 2 is a cross sectional view taken on an orthogonal plane of an intake port 4 of the cylinder head 1 and corresponds to a cross sectional view taken on line A—A in FIG. 1; FIG. 3 is a schematic view illustrating a flow current condition in the cylinder head 1; and FIG. 4 is a schematic plan view of the cylinder head shown in FIG. 3.

As shown in FIGS. 1 to 3, the cylinder head 1 is set on a top of a cylinder block 2 and has the intake port 4 for introducing intake airflow, composed of air and fuel gas delivered from an intake manifold IN, into a cylinder bore 3 and an exhaust port 5 through which exhaust gases resulting from combustion in the cylinder bore 3 are exhausted. Incidentally, the engine intake and exhaust structure is of the type, including one cylinder with four vales, which has two intake valves 6 and two exhaust valves 7.

Disposed inside the intake port 4 is a partition plate 10 that extends along a direction (as shown by a series of whitened arrows FL in FIG. 3) in which intake air flows from an intake-side (an outer terminal side in FIG. 3) toward the cylinder-side.

Figure 4:
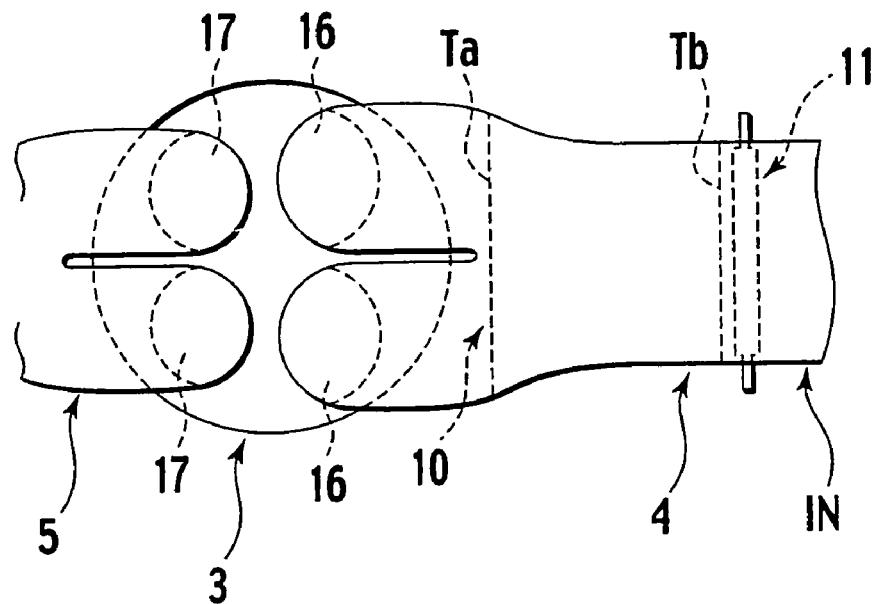
FIG. 4 is a schematic plan view of the cylinder head as viewed in a Z-direction in FIG. 3.

Connected to the cylinder head 10 at the intake-side of the partition plate 10 is the intake manifold IN in which a control valve 11 is disposed as shown in FIGS. 3 and 4. The intake port 4 is partitioned by the partition plate 10 into an upper port 4u and a lower port 4d and on closing the lower port 4d with the control valve 11, intake air flows through the upper port 4u at an increased speed, resulting in the formation of intensified vertical vortex flow, i.e., intensified tumble flow, in the cylinder bore 3.

The intake port 4 has a passage, closer to the cylinder, which is largely curved, and with a cylinder-side distal end Ta of the partition plate 10 located at various incorrect positions, irregularities occur in characteristic of airflow current to remarkably and adversely affect a situation under which tumble flow is generated. Thus, the locating position of the cylinder-side distal end Ta forms an exceptionally important position. In contrast, a position at which the intake-side distal end Tb of the partition plate 10 is located serves as a side at which intake air is divided and in which the control valve 11 is disposed. Thus, even in the presence of irregularities in position of the intake-side distal end Tb, no variation takes place in the characteristic of flow current and in general, the intake-side distal end Tb of the partition plate 10 needs not be set to a position at a higher precision than that required for the position in which the cylinder-side distal end Ta is located.

Therefore, the presently filed embodiment is able to realize a structure wherein in cast molding the cylinder head 1, the cylinder-side distal end Ta is set to a fixed location whereas the intake-side distal end Tb is made relatively free to assume various positions whereby even with the partition plate 10 suffers from thermal affects when pouring molten metal, the thermal affects can be absorbed at areas of the intake-side distal end Tb.

Hereunder, a method of manufacturing the cylinder head is described below in detail.

Figure 5:
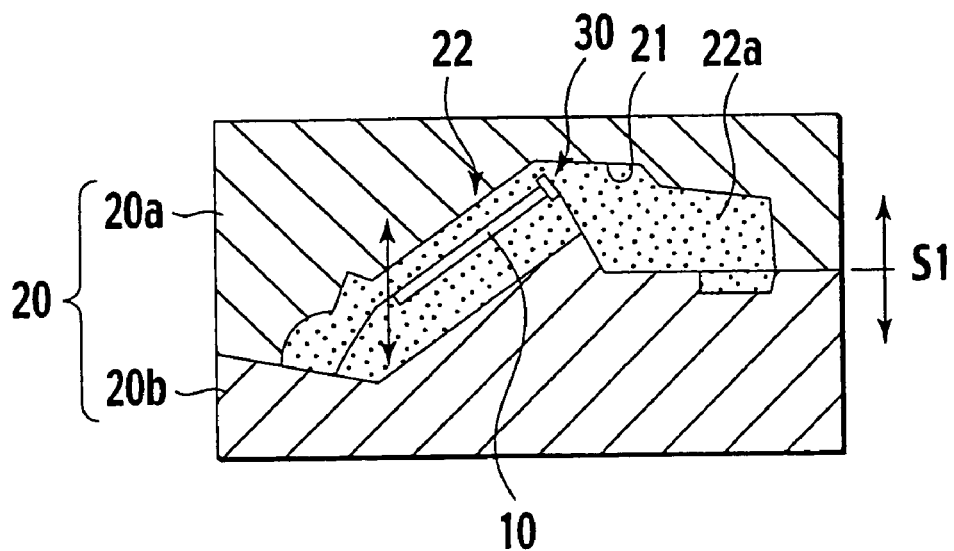
FIG. 5 is a schematic cross sectional view illustrating a mold for molding a port core of the presently filed embodiment.
Figure 6:
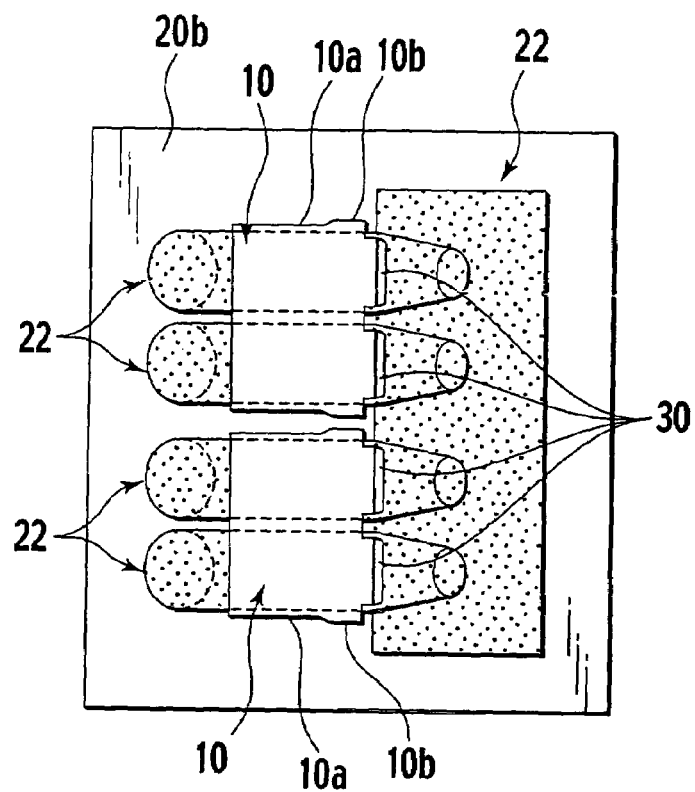
FIG. 6 is a schematic plan view illustrating the mold, for molding the port core of the presently filed embodiment, which is broken away to expose a partition plate.
Figure 7:
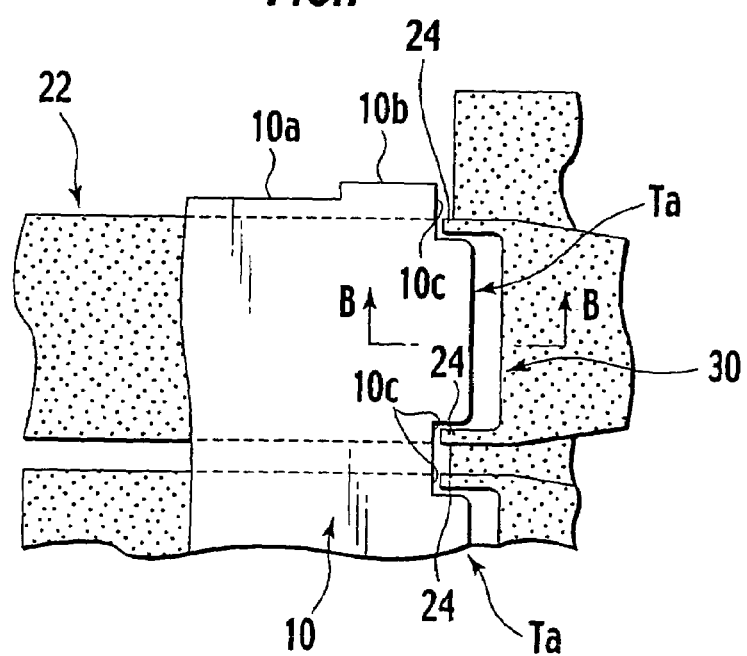
FIG. 7 is an enlarged view illustrating an essential part shown in FIG. 6.
Figure 8:
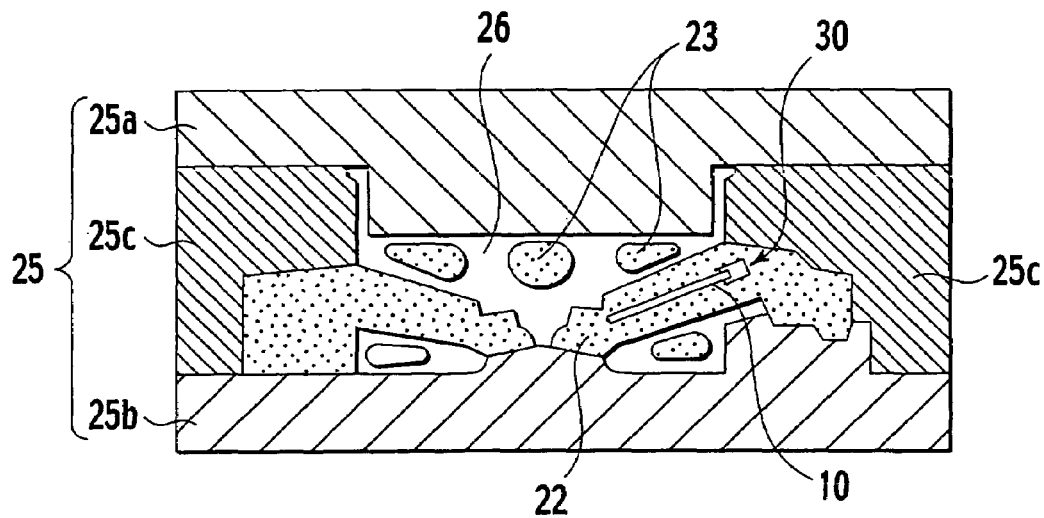
FIG. 8 is a schematic cross sectional view illustrating a condition under which the port core is set in a casting mold for cast molding the cylinder head of presently filed embodiment
Figure 9:
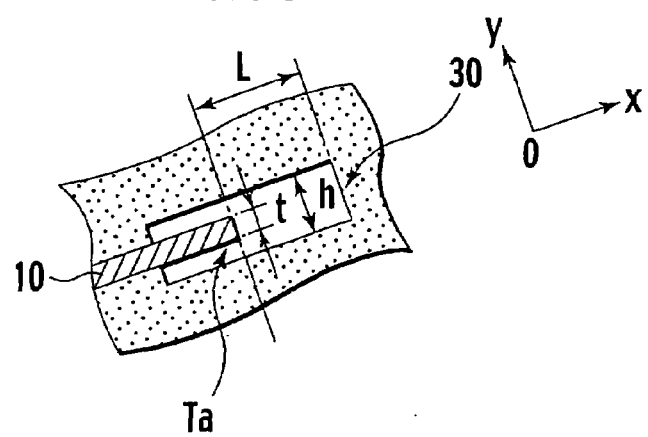
FIG. 9 is a schematic cross sectional view taken on line B—B in FIG. 7.

FIG. 5 is a schematic cross sectional view illustrating a core forming mold (hereinafter referred to as a core mold) for molding a port core (hereinafter referred to as a core) of the presently filed embodiment; FIG. 6 is a schematic plan view illustrating the core forming mold for molding the core of the presently filed embodiment with a portion thereof being cutaway to expose the partition plate; FIG. 7 is an enlarged view of an essential part of FIG. 6; FIG. 8 is a schematic cross sectional view illustrating a die-casting mold in which the core is set for die-casting the cylinder head of the presently filed embodiment; and FIG. 9 is a schematic cross sectional view taken on line B—B of FIG. 7.

With the method of manufacturing the cylinder head of the presently filed embodiment, first, a core 22 is molded using the core mold 20 as shown in FIG. 5. The core mold 20 is comprised of a plurality of partial molds such as a core-forming upper mold 20a and a core-forming lower mold 20b and combining these partial molds internally forms a cavity 21 for molding the core into which mold sand is brown and compacted to form the core 22. Incidentally, reference numeral 22a designates a core print for the core 22.

More particularly, under a condition where the partition plate 10 is set in the core mold 20, mold sand is compacted into the cavity 21 to form the core 22 as shown in FIG. 6. The partition plate 10 is positioned in the core mold 20 in a way not to be displaced and set on a rest formed on a mold parting line of the core mold 20. That is, the partition plate 10 is placed on a peripheral edge of the cavity 21 of the lower mold 20b and, under such a condition, held in fixed place.

The partition plate 10 has side protrusions 10b slightly protruding from side edges 10a, and cutouts 10c formed in the intake-side distal end Tb at the side protrusions 10b as shown in FIG. 7 more in detail. The side protrusions 10b serve as areas that allow the partition plate 10 to be more reliably retained when the partition plate 10 is cast in with molten metal that will be described below. In the meanwhile, the cutouts 10c serve as areas to permit mold sand to enter for thereby forming sand wall portions 24. Here, the term "sand wall portions" is meant the portions that are formed only with mold sand along the cutouts 10c to allow the core 22, which has a thinned wall thickness and is elongated, to extend and that serve as a sort of weirs to prevent the entry of molten metal, and detailed functions will be described later in detail.

Thus, the core 22 is formed in the core mold 20 shown in FIG. 5 and taken out by separating the partial molds, such as the core-forming upper mold 20a and the core-forming lower mold 20b, in a separating direction as shown by an arrow S1 in FIG. 5.

Then, the core 22 is set in a casting mold 25, as shown in FIG. 8, by which a cylinder head 1 is formed. The casting mold 25 is comprised of an upper mold 25a, a lower mold 25b and side molds 25c, and with the core 22 supported between the lower mold 25b and the side molds 25c and covered with the upper mold 25a, a cavity 26 is defined to form the cylinder head 1. Incidentally, reference numeral 23 designates cores for water jackets.

Under such a condition, pouring molten metal, such as aluminum alloy, into the cavity 26 through a pouring gate (not shown) forms the cylinder head 1 as shown in FIG. 1 and during pouring molten metal, thermal expansion occurs in the partition plate 10, set in the core 22, due to heat developed by molten metal.

Here, with the presently filed embodiment, expansion-permit spaces 30 are formed in the core 22 at the intake-side distal end Tb of the partition plate 10 disposed in the core 22. The expansion-permit spaces 30 serve as areas to avoid the occurrence of damages or cracks to the core 22 even in the presence of pressures, resulting from thermal expansion, acting on the partition plate 10 due to heat of molten metal. Incidentally, no shapes of or no positions of the expansion-permit space 30 are major concerns as far as the expansion-permit spaces 30 have a function to permit the thermal expansion of the partition plate 10 and those shown in FIGS. 5 to 9 are formed in the core 22 at the intake-side distal end Tb of the partition plate 10 disposed in the core 22.

Such expansion-permit spaces 30 are formed by removing mold sand from vicinities of the intake-side distal end Tb of the partition plate 10 when forming the core 22. The expansion-permit spaces 30 are determined to be scaled to the extent, as shown in FIG. 9, such that a thickness (a length in a y-direction) is set to be greater than a plate thickness t of the partition plate 10 and a length L between the intake-side distal end Tb of the partition plate 10 and a bottom of the space 30 is set to a value to absorb the elongation of the partition plate 10 in a lengthwise direction (in an x-direction) caused by thermal expansion due to heat of molten metal.

Thus, with the core 22, having such expansion-permit spaces 30, set in the casting mold 25, pouring molten metal into the cavity 26 allows the side edges 10a and the side protrusions 10b of the partition plate 10 to be cast in and with molten metal solidified, these portions such as the side edges 10a and the side protrusions 10b are fixedly retained.

Simultaneously, the partition plate 10 thermally expands due to heat of molten metal and such thermal expansion collectively occurs on the intake-side distal end Tb that is apt to expand in the expansion-permit space 30, i.e., the intake-side distal end Tb of the partition plate 10 merely slides (expands) in the x-direction. As a result, no pressure is applied to the core 22 toward the intake-side distal end Tb of the partition plate 10 and no cracks or damages occur to the core 22 per se.

Also, since the core 22 is formed with the sand wall portions 24 at the intake-side distal end Tb of the partition plate 10, both ends of the expansion-permit spaces 30 remain under a condition substantially covered with the sand wall portions 24, thereby precluding molten metal from directly entering the expansion-permit spaces 30. Accordingly, with molten metal poured, no molten metal substantially enters the expansion-permit space 30 and the sand wall portions 24, each formed in the thinned wall and elongated structure, are broken down with the partition wall 10, in which thermal expansion occurs, thereby permitting the partition plate 10 to slide in the expansion-permit spaces 30. That is, the sand wall portions 24 have no effects to prevent the partition plate 10 from thermal expansion.

As a consequence, under a condition where the position of the cylinder-side distal end Ta, forming an important position, is retained, thermal expansion occurs in the partition plate 10 without causing any damages or cracks to the core 22 to allow the partition plate 10 to be cast in at a high precision for thereby cast molding the cylinder head 1.

Subsequently, since the core 22 is made of sand, it is broken down for removal of the core 22.

As a result, no burrs, resulting from the cracks in the core 22, occur in the resulting cylinder head 1, enabling remarkable reduction in subsequent troublesome deburring work.

Figure 10:
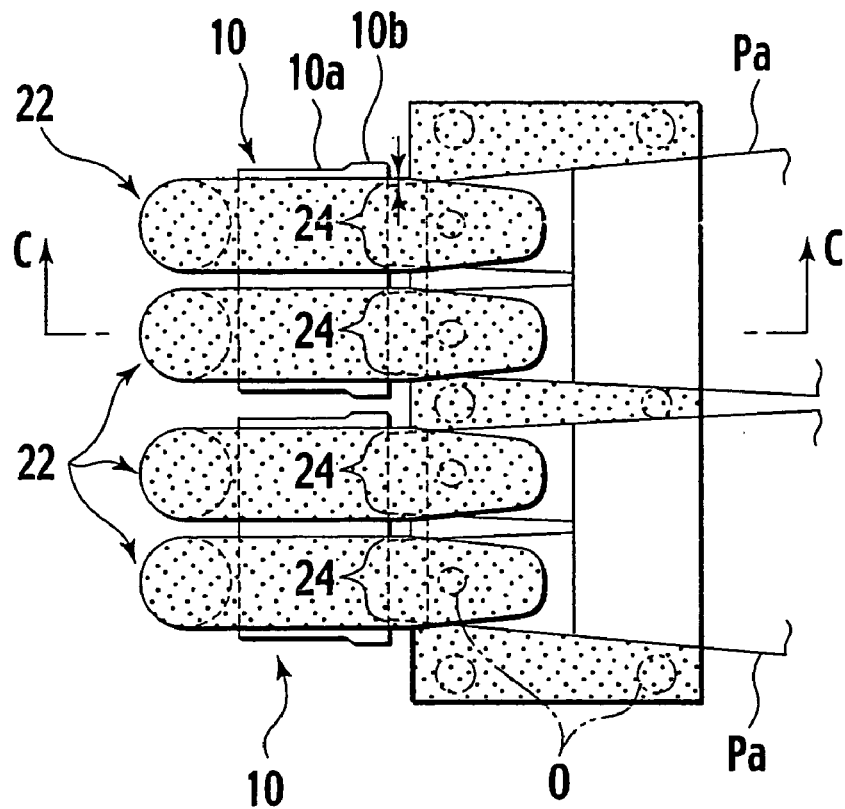
FIG. 10 is a schematic plan view illustrating how an expansion-permit space is formed using a loose piece of the presently filed embodiment.
Figure 11:
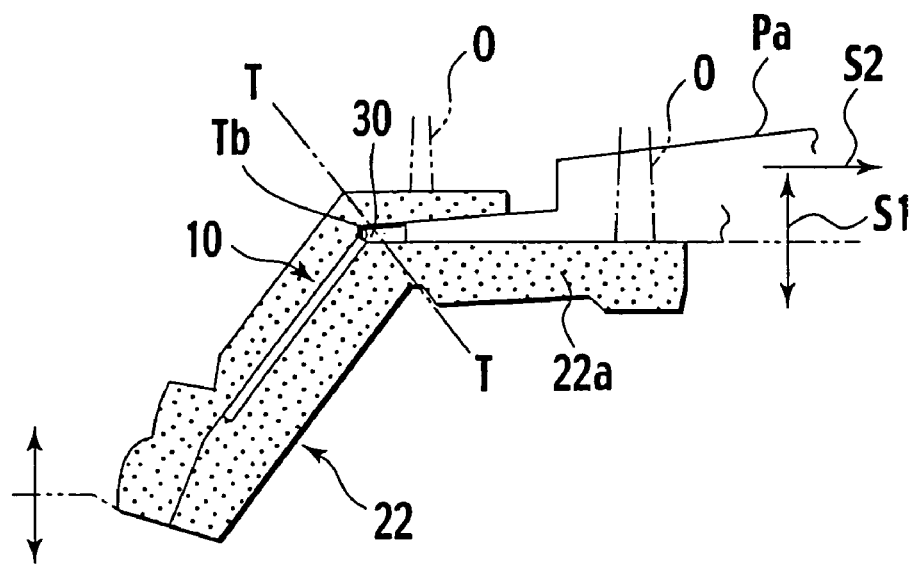
FIG. 11 is a schematic cross sectional view taken on line C—C in FIG. 10.

FIG. 10 is a schematic plan view illustrating how the expansion-permit spaces 30 are formed using loose pieces Pa, and FIG. 11 is a schematic cross sectional view taken on line C—C of FIG. 10.

Although a need arises for removing mold sand from the core 22, in a configuration corresponding to the expansion-permit spaces 30, in order to form the expansion-permit spaces 30, here, loose pieces Pa are used as forming members to form the spaces 30.

As shown in FIG. 10 in a plan view and, more particularly as shown in FIG. 11, each loose piece Pa has a distal end with a size corresponding to the space 30 and includes a plate having an upper surface sloped in a tapered shape from the distal end and a lower surface on a substantially horizontal plane. For the purpose of forming the spaces 30 at the intake-side distal end Tb of the partition plate 10, this plate is set in the core 22 and removed after the core 22 has been formed. Incidentally, in the drawing figures, reference "O" designates a sand blowing port through which mold sand is blown.

More particularly, the loose pieces Pa are set with the respective distal ends held in abutting engagement with the intake-side distal end Tb of the partition plate 10 when forming the core 22 and after mold sand is blown into the cavity through the sand blowing port O to form the core 22, is moved in a direction (as shown by an arrow S2 in the drawing figure) perpendicular to a direction, in which the core mold 20 is separated when the core mold 20 shown in FIG. 5 is separated in a direction as shown by an arrow S1, to be removed with the core mold 25. Incidentally, FIGS. 10 and 11 show a status where the loose pieces Pa are moved in the direction S2 from a condition where the loose pieces Pa are held in abutment with the intake-side distal end Tb.

In FIG. 11, a line T—T indicates a surface that is mechanically processed in subsequent step and the core 22 is made to relatively ease breakdown at a side, closer to the core print 22a, which is removed in such subsequent mechanical processing. In the event that the core is damaged in such a way, if the core 20 is chosen to have a pertinent area onto which mechanical processing is necessarily made, subsequent correction can be easily made, thereby enabling reduction in probabilities in causing defective products.

More particularly, the loose pieces Pa are separated from the mold in the direction S2 perpendicular to the direction S1, in which the core mold 20 is separated, and the expansion-permit spaces 30 are formed so as to horizontally extend from the intake-side distal end Tb of the partition plate 10 disposed in the core 22 as shown FIG. 11.

Figure 12:
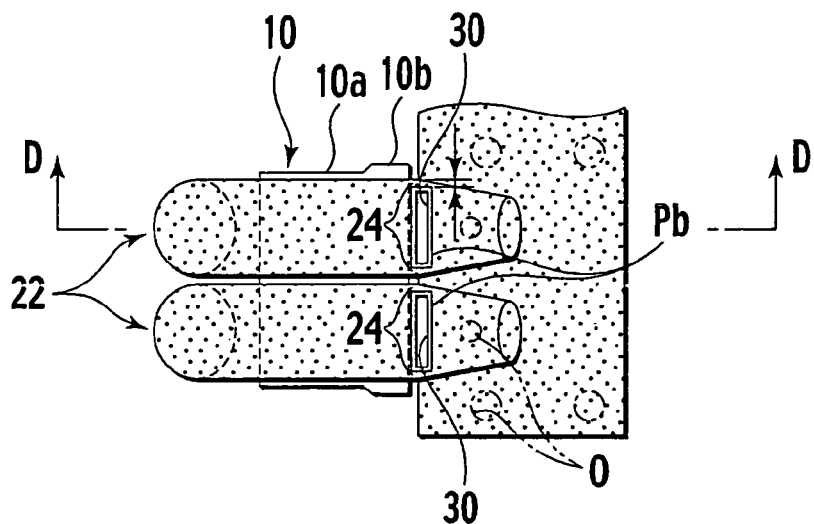
FIG. 12 is a schematic plan view illustrating how an expansion-permit space is formed using a projection of another example of the presently filed embodiment.
Figure 13:
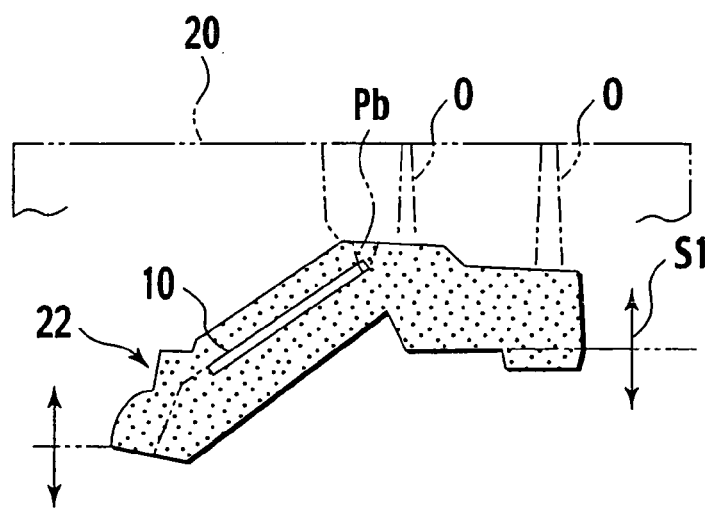
FIG. 13 is a schematic cross sectional view taken on line D—D in FIG. 12.

FIG. 12 is a schematic plan view illustrating another example in which the expansion-permit spaces 30 are formed, and FIG. 13 is a schematic cross sectional view taken on line D—D of FIG. 12.

Since a thermal expansion amount of the partition plate 10 is relatively low, the expansion-permit spaces 30 are not necessarily formed in a way to elongate in a surface direction of the partition plate 10.

That is, as shown in FIGS. 12 and 13, the core mold 20 is partly formed with projections Pb by which when separating the core mold 20, the expansion-permit spaces 30 are formed so as to extend from the intake-side distal end Tb of the partition plate 10 in an up-down direction, i.e., in a vertical direction shown in FIG. 13.

More particularly, the projections Pb are set in position under a condition where when forming the core mold 22, distal ends of the projections Pb are held in abutment with the intake-side distal end Tb of the partition plate 10. Then, mold sand is blown into the cavity through the sand blowing port O and form the core 22 and thereafter, dividing the core mold 20 as shown in both arrows S1 for separation results in the formation of expansion-permit spaces 30 corresponding to the projections Pb. Incidentally, in cases where when forming the core mold 20, a need arises for precluding the entry of molten metal from sides of the spaces 30, both sides of the spaces 30 may be formed with sand wall portions.

Subsequently, as shown in FIG. 8, the core 22 is set in the casting mold 25 and molten metal is poured. When this takes place, if probabilities exist where molten metal enters the expansion-permit spaces 30 from side areas, molten metal is poured with the spaces 30 being closed with separate side molds (not shown).

Thus, when molten metal is poured into the cavity under a condition where the vertically extending spaces 30 are formed at the intake-side distal end Tb of the partition plate 10, the expansion-permit spaces 30 have volumes greater than an extending length of the partition plate 10 resulting from thermal expansion, thereby enabling to absorb a thermally expanded volume of the partition plate 10.

Second Embodiment

A second embodiment according to the present invention is described below.

Figure 14:
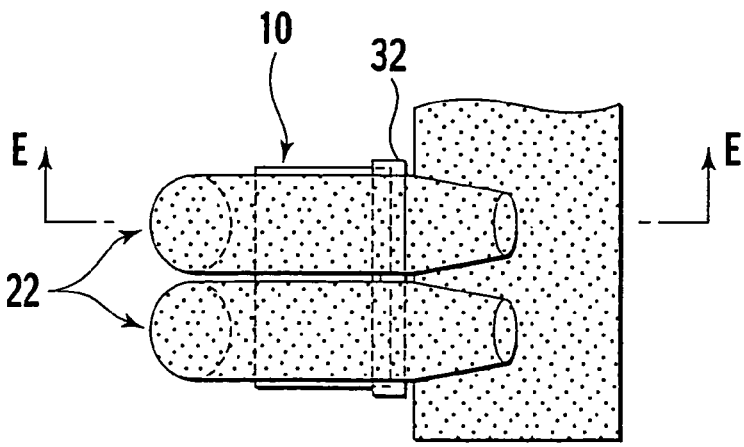
FIG. 14 is a schematic plan view illustrating a structure wherein a plate member of a second embodiment according to the present invention is located at an end of a partition plate.
Figure 15:
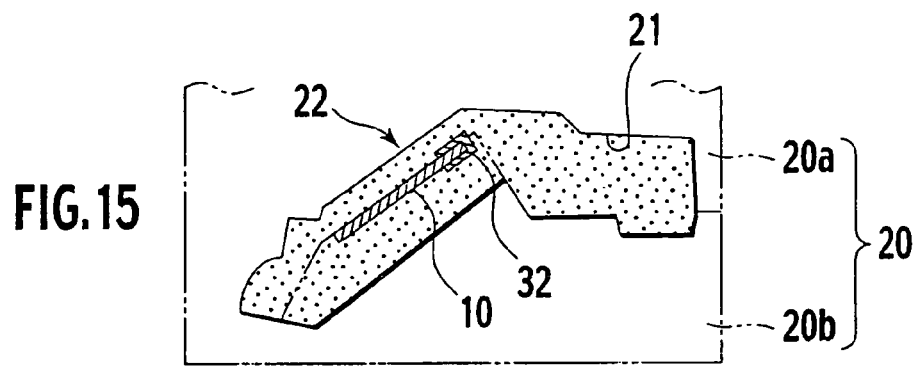
FIG. 15 is a schematic cross sectional view taken on line E—E in FIG. 14.

FIG. 14 is a schematic plan view illustrating a structure wherein a plate member of the presently filed embodiment is located at an end of a partition plate; FIG. 15 is a schematic cross sectional view taken on line E—E of FIG. 14; and FIG. 16 is an enlarged view of an essential part of FIG. 15.

Figure 16:
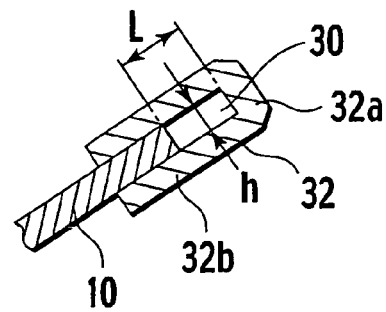
FIG. 16 is an enlarged view illustrating an essential part shown in FIG. 15.

As shown in FIGS. 14 to 16, expansion-permit spaces 30 of the presently filed embodiment are formed using a plate member 32, with a U-shaped configuration in cross section, which covers the intake-side distal end Tb of the partition plate 10.

When forming the core 22 under a condition where the partition plate 10 is preliminarily placed in the core mold 20 as shown in FIG. 15, the plate member 32 is placed on the circumferential edge of the cavity 21 of the core mold 20 under a condition where a body section 32b engages the partition plate 10 in a way to allow a U-shaped bottom wall 32a to be placed on an intake side such that the expansion-permit spaces 30 are formed in areas near the end, closer to the intake side, of the partition plate 10 as shown in detail in FIG. 16.

The plate member 32 may be made of the same material as that of the partition plate 10, or may be formed of other metal or other material such as ceramics having heat resistance than metal. Even when the plate member 32 is formed of the same material as that of the partition plate 10, the plate member 32 is smaller than the partition plate 10 in respect of a direction in which the partition plate 10 extends and so, the thermal expansion of the plate member 32 resulting from heat of molten metal can be substantially ignored. Further, since the plate member 32 has both ends protruding from the core 22, it is conceived that molten metal enters an inside of the plate member 32 and both sides of the plate member 32 may be closed with side molds if desired.

Of course, the spaces 30 to be formed with the plate member 32 may be configured in a dimension with the thickness h and the length L described with reference to the first embodiment.

Thus, forming the expansion-permit spaces 30 using the plate member 32 not only enables thermal expansion of the partition plate 10 to be absorbed but also enables the spaces 30 to be easily formed, enabling the core 22 to be rapidly formed while providing improvement over workability.

Figure 17:
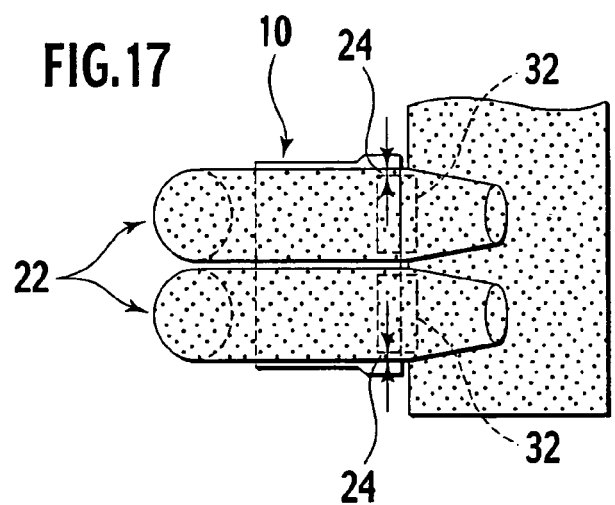
FIG. 17 is a schematic plan view illustrating a modified form of the structure wherein the plate member of the presently filed embodiment is located at the end of the partition plate.

FIG. 17 is a schematic plan view of an essential part illustrating a modified form of the structure in which plate members of the presently filed embodiment are placed at the end of the partition plate.

That is, no limitation is intended to the plate member 32 with a structure in which the plate members 32 extend through a pair of cores 22 in a direction (vertical direction in FIG. 17) perpendicular to axes of the cores 22 and the plate member 32 may be divided into separate pieces that are provided so as to be buried in the cores 22.

By so doing, sand wall portions 24 are formed on ends of the plate members 32, respectively, to enable the cores 22 per se to preclude molten metal from entering the insides of the plate members 32, thereby improving workability.

Incidentally, in the presently filed embodiment, the plate member 32 with a U-shape in cross section is removed by mechanical processing after the formation of a cylinder head.

Third Embodiment

A third embodiment according to the present invention is described below.

Figure 18:
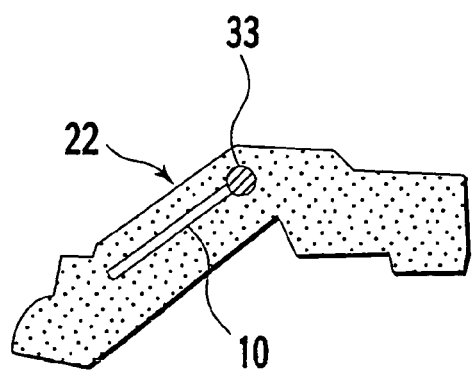
FIG. 18 is a schematic cross sectional view illustrating a structure wherein a thermally soluble insert of a third embodiment according to the present invention is located in a core.

FIG. 18 is a schematic cross sectional view illustrating a structure in which an insert, having a thermal solubility, of the presently filed embodiment according to the present invention is placed in a core.

With the presently filed embodiment, the expansion-permit space 30 is formed using a thermally soluble insert 33 and the insert 33 is disposed in the core 22 in contact with the intake-side distal end Tb of the partition plate 10.

An example of the thermally soluble insert 33 may include wax, styrene foam and various plastic foams.

As shown in FIG. 18, pouring molten metal to the intake-side distal end Tb of the partition plate 10 disposed in the core 22 with the core 22 containing the thermally soluble insert 33 allows the thermally soluble insert 33 to be melt with heat of molten metal, thereby forming given spaces 30 with no presence of mold sand in the core 22. Consequently, with the partition plate 10 thermally expanded due to heat of molten metal, the partition plate 10 smoothly expands in the spaces 30 with no probability for the core 22 to be pressed or no occurrence of cracks.

Although the insert 33 is thermally soluble and it is preferable for molten metal to be prevented from entering the spaces 30 resulting from the insert 33 dissolved by molten metal, the core 22 may be suitably formed with sand wall portions to restrict the entry of molten metal for a period wherein the partition plate 10 expands.

When mounting the thermally soluble insert 33 onto the partition plate 10, the insert 33, made of wax, may be melted and applied onto the partition plate 10 whereupon wax is solidified. Further, if the insert 33 is made of styrene foam, the insert 33 may be mounted to the partition plate 10 using adhesive, or the partition plate 10 may be formed with a notch by which the insert 33 is physically fixed.

Additionally, not only the insert 33 may be formed of material that is soluble due to heat of molten metal, i.e., material that is necessarily dissolved to disappear, but also the insert 33 may be sufficed to include material that does not disturb the thermal expansion of the partition plate 10. An example of the insert 33 may include elastic materials. The elastic materials may include a variety of fabrics, felt and sponge rubber.

Thus, by pouring molten metal under a condition where the insert 33, made of elastic material, is set in the core 22 at the intake-side distal end Tb of the partition plate 10 disposed in the core 22, given spaces 30 are formed in the core 22 in a final stage while permitting the thermal expansion of the partition plate 10 to some extent and the elastic material per se deforms to permit the partition plate 10 to thermally expand.

When mounting elastic material onto the partition plate 10, the elastic material may be fixed on the partition plate 10 through adhesive or in a physical manner.

Incidentally, while the foregoing presently filed embodiments are related to the formation of the cylinder head and have been studied on thermal expansion of the partition plate, the present invention is not necessarily limited to only the partition plate and the present invention may be widely applied to cases where a metallic plate is concurrently cast in during casting operation. Also, the expansion-permit space 30 is disposed on the intake side but may be disposed on a cylinder side.

Now, description is made of further detailed Examples.

EXAMPLE 1

In this Example, the expansion-permit spaces 30 were formed using the loose pieces Pa shown in FIGS. 10 and 11. Several kinds of the partition plates 10 were prepared with a thickness in a range equal to or greater than 0.5 mm and equal to or less than 3 mm, and the loose pieces Pa were set in the core mold 20 in a way to enable the loose pieces Pa to be pulled out in a direction substantially perpendicular to a direction in which the core mold 20 is separated when forming the core 22.

The loose pieces Pa had distal ends larger in thickness than the plate thickness of the partition plate 10 and had configurations to form the spaces 30 in a length of a value approximately greater than 0.5 to 3 mm starting from the intake-side distal end Tb of the partition plate 10. Also, the cores 22 were formed with the sand wall portions 24 with a thickness approximately equal to or greater than 1 mm and equal to or less than 2 mm.

After the cores were formed, the loose pieces Pa were pulled out and the cores 22 were set in the casting mold 25 for forming the cylinder head and on pouring molten metal, no molten metal entered the spaces 30 due to effects of the sand wall portions 24. Further, the partition plate 10 thermally expanded due to heat of molten metal and the thermal expansion was absorbed in the space 30 whereby no cracks or damages were found in the core 22.

EXAMPLE 2

In this Example, the expansion-permit spaces 30 were formed using the projections Pb shown in FIGS. 12 and 13. Several kinds of the partition plates 10 were prepared with a thickness in a range equal to or greater than 0.5 mm and equal to or less than 3 mm, and the projections Pb were rendered to remain under a condition where when forming the core 22, the projections Pb of the core mold 20 were held in abutment with the end of the partition plate 10.

The projections Pb had configurations to form the spaces 30 in a length of a value approximately greater than 0.5 to 3 mm starting from the intake-side distal end Tb of the partition plate 10.

After the cores were formed, the projections Pb together with the core mold 20 were removed from the mold and the cores 22, formed with the spaces 30, were set in the casting mold 25 for forming the cylinder head and upper surfaces of the spaces 30 were closed with side molds. On pouring molten metal, no molten metal entered the spaces 30 and the partition plate 10 thermally expanded due to heat of molten metal but the thermal expansion was absorbed in the spaces 30 and no cracks or damages were found in the core 22.

EXAMPLE 3

In this Example, the expansion-permit spaces 30 were formed using the relatively long plate member 32, formed in the U-shape in cross section, shown in FIGS. 14 to 16. Several kinds of the partition plates 10 were prepared with a thickness in a range equal to or greater than 0.5 mm and equal to or less than 3 mm, and the plate member 32 was used which was made of the same material as that of the partition plate 10 and had a configuration to form the spaces 30 each in a length ranging approximately from 0.5 to 3 mm.

The partition plate 10 and the plate member 32 mutually engaged and under such a condition, they were set in the cores 22 whereupon the cores 22 were set in the casting mold for forming the cylinder head while the both sides of the plate member 32 were closed with side molds. On pouring molten metal, no molten metal entered the plate member 32 and the partition plate 10 thermally expanded due to heat of molten metal but the thermal expansion was absorbed in the spaces 30 formed in the U-shaped plate member 32 and no cracks or damages were found in the core 22.

EXAMPLE 4

In this Example, the expansion-permit spaces 30 were formed using the relatively short plate members 32, each formed in the U-shape in cross section, shown in FIG. 17. Several kinds of the partition plates 10 were prepared with a thickness in a range equal to or greater than 0.5 mm and equal to or less than 3 mm and several kinds of U-shaped plate members 32, made of the same material as that of the partition plate 10 with the same thickness as that of the partition plate 10 but an upper limit selected to be less than 1 mm, that is, the thickness in a range equal to or greater than 0.5 mm and equal to or less than 1 mm, were mounted onto the partition plates 10 whereupon the plate members 32 were set in the cores 22 to form the spaces 30 each in a length ranging approximately from 0.5 to 3 mm.

The cores 22 were set in the casting mold for forming the cylinder head and molten metal was poured. The conditions of the partition plate 10 and the cores 22 had the same favorable results as those of Example 1. With this Example, since no U-shaped plate members 32 were cast in with molten metal, the U-shaped plate members 32 could be removed together with the core when removing the same after cast molding.

As set forth above, with the method for manufacturing the cylinder head according to the present invention, since the partition plate is preliminarily set in the core that forms the intake port of the cylinder head and the expansion-permit space, for permitting the thermal expansion of the partition plate, is formed in the area, which forms at least a distal end of the core on the intake side of the partition plate, the partition plate is precluded from adversely affecting the core during thermal expansion due to heat of molten metal, thereby enabling the cylinder head to be smoothly formed. That is, even in the presence of thermal expansion occurred in the partition plate due to heat of molten metal, no damages or cracks occur in the core due to the pressed force resulting from the expansion, and the partition plate per se can be located in a given position at a high positioning precision.

Particularly, the partition plate is disposed in the intake port for the purpose of causing tumble flow to occur in an air stream, flowing from the intake side toward the cylinder side, inside the cylinder and a position, at which the end of the partition plate is located, forms an important factor. In this respect, forming the expansion space in the core at the position closer to the intake side of the partition plate enables the terminal position of the partition plate closer to the cylinder side to be held at a given position even in the presence of thermal expansion of the partition plate, thereby enabling intake tumble flow to be reliably intensified.

Further, with the cracks occurred in the core, although burrs occur on the cylinder head resulting from cast molding to cause troublesome deburring work, the presence of the expansion-permit space precludes the occurrence of cracks in the core and nor deburring work is required in subsequent stage. Also, the expansion-permit space can be formed by merely applying slight correction to the casting mold and the cylinder head can be smoothly manufactured, thereby providing preferable workability.

The entire content of a Patent Application No. TOKUGAN 2003-359929 with a filing date of Oct. 20, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A method of manufacturing a cylinder head having a partition plate for an intake port, comprising:

preparing a partition plate having an intake-side distal end and a cylinder-side distal end;

locating the partition plate in a core, to form an intake port, with an expansion-permit space disposed around the intake-side distal end of the partition plate to permit thermal expansion of the partition plate caused by heat of molten metal; wherein the core retains the cylinder-side distal end of the partition plate;

supplying molten metal to a periphery of the partition plate;

solidifying the molten metal; and removing the core.

2. The method according to claim 1, wherein the core includes a sand core.

3. The method according to claim 1, wherein the partition plate extends between the intake-side distal end and the cylinder-side distal end and includes a pair of side edges that are cast in molten metal during cast molding.

4. The method according to claim 1, wherein the expansion-permit space has a dimension to permit a thickness and extension, resulting from thermal expansion, of the partition plate.

5. The method according to claim 1, wherein the expansion-permit space is connected to the intake-side distal end of the partition plate.

6. The method according to claim 1, wherein the expansion-permit space is formed at the time the core is being formed using a plate member that is freely removable in a direction intersecting a direction in which a core mold for molding the core is divided.

7. The method according to claim 1, wherein the expansion-permit space is formed at the time the core is being formed using a projection disposed in a core mold for forming the core.

8. The method according to claim 1, wherein the expansion-permit space is formed at the time the core is being formed using a plate member, formed in a U-shaped cross section, by which the partition plate is sandwiched with a bottom wall of the plate member being positioned at an end of the partition plate.

9. The method according to claim 8, wherein a pair of side edges of the plate member with the U-shaped cross section is located outside the core.

10. The method according to claim 8, wherein the plate member with the U-shaped cross section is located inside the core.

11. The method according to claim 1, wherein the expansion-permit space is formed at the time the core is being formed using an insert disposed on an end of the partition plate.

12. The method according to claim 11, wherein the insert is thermally soluble.

13. The method according to claim 11, wherein the insert includes an elastic material.

14. The method according to claim 1, wherein a part of the core by which the expansion-permit space is defined includes a wall to restrict the molten metal from entering.

* * * * *